United States Patent [19]
Bret

[11] 3,999,144
[45] Dec. 21, 1976

[54] PROCESS FOR ELIMINATING SMALL-SCALE INTENSITY FLUCTUATIONS OF LASER BEAMS

[75] Inventor: Georges Bret, Verrieres-le-Buisson, France

[73] Assignee: Quantel S.A., Vigneux, France

[22] Filed: Feb. 8, 1974

[21] Appl. No.: 440,866

[30] Foreign Application Priority Data

Feb. 8, 1973  France ............................. 73.04503
Feb. 8, 1973  France ............................. 73.04504

[52] U.S. Cl. .................. 331/94.5 N; 331/94.5 S
[51] Int. Cl.² ................................. H01S 3/13
[58] Field of Search .......... 331/94.5; 350/160, 161; 330/4.3

[56] References Cited
UNITED STATES PATENTS 3,434,779  3/1969  Damen et al. ............... 331/94.5 C
3,575,668  4/1971  Smith .......................... 331/94.5 N

*Primary Examiner*—William L. Sikes
*Attorney, Agent, or Firm*—Holman & Stern

[57] ABSTRACT

A method for eliminating small-scale, spatial intensity fluctuations in laser beams is disclosed comprising the steps of placing in the path of the laser beam at least one nonlinear filtering element constituted by a fluid medium, having an index of refraction increasing with the intensity of light passing through the fluid medium and focusing only the laser's small-scale, spatial intensity fluctuations above a predetermined power threshold at a focal point within the fluid medium whereby the energy contained in these fluctuations is dissipated. Alternatively, the nonlinear filter element can be constituted by a fluid medium wherein high-frequency sound waves propagate with low attenuation wherein only the small-scale, spatial intensity fluctuations above a stimulated Brillouin power threshold are back-reflected whereby the energy contained in those fluctuations is eliminated.

8 Claims, 5 Drawing Figures

PROCESS FOR ELIMINATING SMALL-SCALE INTENSITY FLUCTUATIONS OF LASER BEAMS

BACKGROUND OF THE INVENTION

The present invention relates to the improvement of high-power laser systems employed for example in telemetry, plasma physics or thermonuclear fusion, without this list being intended to be limiting.

Power laser systems usually comprise one or more amplifying elements in which a beam of increasing intensity is propagated, one thereof forming the oscillator.

Owing to the conditions at the limits (diaphragm, edge of the amplifiers) and imperfections in these media, an even perfect beam (plane or spherical wave) becomes deformed and rather rapidly has small-scale intensity fluctuations the transverse dimensions of which may be small with respect to the diameter of the beam.

These small-scale intensity fluctuations considerably limit the overall energy contained in the beam since they are subject in all the transparent media and consequently in the amplifiers, to a self-focussing effect. Moreover, in the case of solid systems this self-focussing effect produces a localized deterioration of the amplifying media and this is the cause of irreversible damage. It is also known that this effect becomes more rapid as the transverse dimension of the small-scale intensity fluctuations decreases (see for example the article by R. Y. Chiao, E. Garmire and C. H. Townes, Physical Review Letters, 13, 479 (1964).

In the oscillators the energy density is still higher and there is a danger that the electro-optical systems, the mirrors and other elements will be damaged.

The presence of these small-scale intensity fluctuations consequently considerably decreases the acceptable limit power in the amplifying media.

SUMMARY OF THE INVENTION

An object of the invention is to overcome the aforementioned drawbacks and to provide a system for eliminating the small-scale intensity fluctuations of the beams.

The invention provides a process for eliminating small-scale intensity fluctuations of laser beams comprising placing in the path of the laser beam at least one nonlinear filtering element constituted by a fluid medium.

Another object of the invention is to provide a system for carrying out the aforementioned process with comprises at least one nonlinear filtering element placed in the path of the laser beam, said filtering element being constituted by a fluid medium.

BRIEF DESCRIPTION OF THE DRAWINGS

Further features and advantages of the invention will be apparent from the ensuing description with reference to the accompanying drawing.

In the drawing.

DETAILED DESCRIPTION OF THE PREFERRED EMBODIMENTS

Before describing the filtering element for small-scale intensity fluctuations according to the invention, a solution to the problem from the theoretical point of view will be examined.

When the equations of interaction of the electromagnetic fields with an optical medium are written, infinite plane waves are usually considered — which simplifies the problem.

A laser beam has a finite section of rays R and the transverse distribution of energy has a maximum in the centre of the beam. A medium is then considered whose index of refraction, which varies with the light intensity passing therethrough, includes a term $n_2E^2$ which depends on the square of electric fields E:

$$n = n_0 + n_2E^2 \qquad 1.$$

wherein $n_0$ is the normal index of refraction of the medium and wherein the increase of the index $n_2E^2$ proportional to the square of the electric field is due, for example, to the orientation of the molecules under the effect of this field (induced Kerr effect). Thus $n_2E^2$ appears as the coefficient of the second term of an expansion of the index of refraction as a function of the electric field applied, the term E having a coefficient $n_1 = 0$.

Thus the index of refraction is higher on the axis of the beam than on its edges. under these conditions, a ray of the beam propagated in a direction parallel to the axis at a distance r from the latter is inflected towards the axis of the beam with a radius of curvature $\rho$ given by the expression:

$$\frac{1}{\rho} = \frac{1}{n_0} \cdot \frac{\delta n}{\delta r} = \frac{n_2}{n_0} \left( \frac{d^2 |E|^2}{dr^2} \right) r \qquad (2)$$

the second derivatives of the intensity of the laser beam being of the order of $$\frac{|E|^2}{\left(\frac{R}{2}\right)^2} = \frac{4E^2}{R^2}$$

This gives an order of magnitude of the distance $l_f$ at which this ray intersects the axis $$l_f = (\rho r)^{1/2} = \frac{1}{2} R \left( \frac{n_o}{n_2 |E|^2} \right)^{1/2} \quad (3)$$

A critical condition is obtained by writing that this curvature of the rays on the edges of the beam compensates the effect of the diffraction:

$$\frac{1}{2} R \left( \frac{n_o}{n_2 |E|^2} \right)^{1/2} = \frac{4R^2 n_o}{(1.22\nu)}$$

whence the threshold power is deduced:

$$P \text{ (threshold)} = \frac{C}{8\pi} \pi R^2 n_o |E|^2 = \frac{(1.22\nu)^2 C}{512 \, n_2}$$

This example is obviously very simplified, but its interest is to show that any mechanism introducing a variation in the index proportional to the energy contained in the beam on principle enables the laser light, if E is sufficient, to be self-focussed in the medium.

Equation (2) shows that the self-focussing length depends on the term $n_2$ and on the radius R of the small-scale intensity fluctuations.

Figure 1:
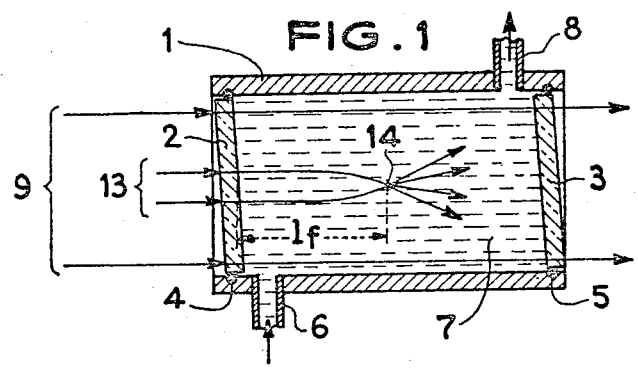
FIG. 1 is a diagrammatic view of a filtering element for filtering small-scale intensity fluctuations of laser beams by a localised self-focussing of the beam.

With reference now to the drawing, FIG. 1 shows an element for eliminating small-scall intensity fluctuations of a laser beam according to the invention.

This element comprises mainly a case which has two windows 2, 3 of a transparent material, for example glass, at its two opposed ends, the sealing between the walls of the case 1 and the windows 2 and 3 being achieved by O-rings 4 and 5 respectively. The windows 2 and 3 are slightly inclined to the vertical so as to avoid reflections in the direction of the beam. The case 1 has a tubular inlet connector 6 in its lower part for a fluid 7 which constitutes the nonlinear filtering medium of the element and a tubular outlet connector 8 for this fluid.

The nature of the fluid depends on the wavelength of the light to be filtered, on the duration of the leser pulse and on the mean intensity above which an elimination of the small-scale intensity fluctuations is desired to be obtained.

The fluid 7 is made to flow by a pump (not shown) connected to the connectors 6 and 8.

The element for eliminating small-scale intensity fluctuations just described is placed in the path of a beam 9 of light in such manner that the windows 2 and 3 of the case constitute respectively the input window and the output window for the beam 9 emitted by a laser (not shown).

Figure 5:
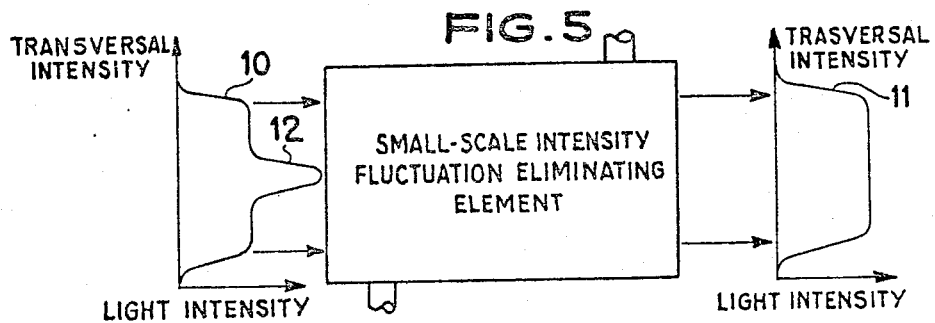
FIG. 5 is a diagrammatic representation of the distribution of the intensity of a laser beam at the input and the output of a filtering element such as that shown in FIG. 1 or in FIG. 3.

In order to examine the operation of the intensity fluctuation eliminating element described with reference to FIG. 1, reference will also be made to FIG. 5 which shows the distribution of the intensities of the laser beam at the input of the eliminating element represented by the curve 10 and the distribution of this intensity at the output of said element represented by the curve 11.

The curve 10 has in its intermediate part an intensity fluctuation peak 12 which is supposed to be the sole peak in order to simplify the description and which must be eliminated. The laser beam 9 enters the filtering medium 7 through the window 2.

As the major part of the beam 9 has an intensity lower than the self-focussing threshold of the medium 7, it traverses this medium with no deformation and issues therefrom through the window 3.

The part 13 of the beam corresponding to the peak 12 of the curve 10 is focussed by the medium 7 at 14 at a distance 1f defined by the relation (3), and the energy it contains is dispersed in a large solid angle or absorbed by the medium so that at the output of the eliminating element the laser beam 9 has a distribution devoid of small-scale intensity fluctuations. The self-focussing which occurs at 14 produces a localized disturbance of the properties of the madium 7 but, owing to the fact that this medium is flowing constantly, the parts of the medium concerned by the self-focussing are always renewed so that the properties of the eliminating element are unaffected.

Further, the permanent flow of the fluid 7 in the case of the element permits the obtainment of a good homogeneity of its index of refraction. As the beam of light is emitted by a neodymium glass laser and has a wavelength $\lambda = 1.06 \, \mu$, there is employed as the self-focussing fluid any liquid having elongated molecules and a short orientation time, such as carbon disulphide, chloronaphthalene or nitrobenzene.

Figure 2:
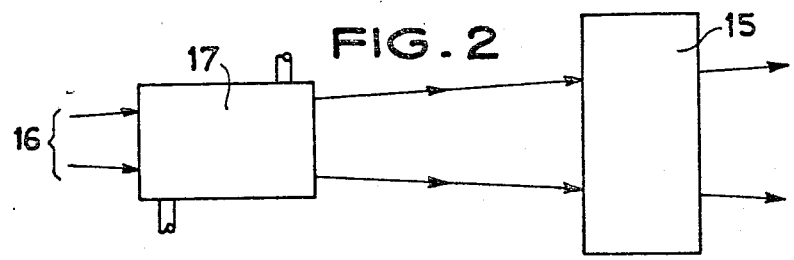
FIG. 2 is a diagrammatic view of a laser beam amplifying system equipped with a filtering element such as that shown in FIG. 1.

The amplifying system shown in FIG. 2 comprises an amplifying medium 15 placed in the path of a beam 16 of light emitted by a laser (not shown).

Disposed upstream of the amplifying medium 15 is an eliminating element 17 of the type shown in FIG. 1 whose transparent medium has a low self-focussing threshold. The laser beam has its small-scale intensity fluctuations removed in the element 17 and is applied to the amplifying medium 15 in which it undergoes the desired amplification with no risk of deterioration of the medium 15.

The amplifying medium 15 may be a single medium or comprises a group of amplifying media arranged in cascade.

Further, in the amplifying system, a plurality of elements of the type shown in FIG. 1 may be placed in the path of the same beam. The relative position of the elements must then be chosen in such manner as to reduce the re-injection of focussed light in the amplifying medium disposed immediately after an eliminating element.

The intensity fluctuation eliminating element just described with reference to FIG. 1 gives excellent results when it is employed for treating extremely short pulses of a duration of, for example, between 20 and 200 ps.

Figure 3:
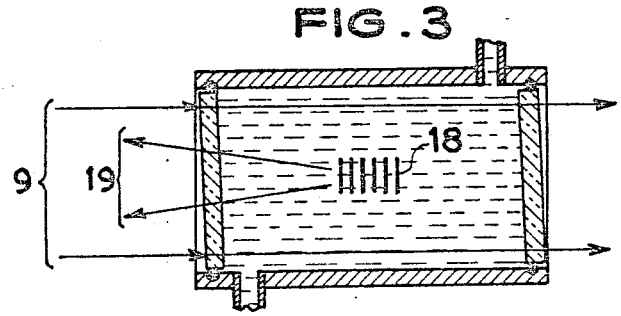
FIG. 3 is a diagrammatic view of a filtering element for small-scale intensity fluctuations of laser beam operating by a localized retrodiffusion of the beam.

FIG. 3 shows an intensity fluctuation eliminating element which employs the phenomenon of retrodiffusion by a stimulated Brillouin effect.

As concerns this phenomenon, reference may be had to the article by Denariez and Bret published in the Physical Review, Volume 171, pages 160–171, July 1968 wherein a "stimulated Brillouin power threshold" is determined by the relationship on page 163:

$$G_{max} = \frac{2\pi}{n^3 C^3} \frac{\nu_s}{\Delta \nu_s} \frac{\gamma^2 \nu \rho h \nu_s \nu_L}{K}$$

This element is of a construction identical to that of the element shown in FIG. 1 and consequently will not be described in detail.

The difference between the element shown in FIG. 1 and that shown in FIG. 3 resides essentially in the duration of the pulses which must be treated and in the filtering medium employed.

With a beam emitted by the same neodymium glass laser, as in the case of the embodiment shown in FIG. 1, the element shown in FIG. 3 is employed for pulse durations, for example between 1 and 20 ns which are longer than the time it takes to establish sound waves which are the basis of the retrodiffusion phenomenon employed.

The filtering medium filling the case of the element is a fluid having a good transparency to the wavelength employed and a low attenuation in respect of high-frequency sound waves. Acetone or benzene is most satisfactory for this application.

This eliminating element operates in the following manner:

The major part of the beam 9 passes through the eliminating element with no deformation.

The intensity fluctuation peak 12 (FIG. 5) produces sound waves 18 which reflect it and the energy it contains is dispersed in a solid angle 19 which is as large as the small-scale intensity fluctuations is narrow.

Figure 4:
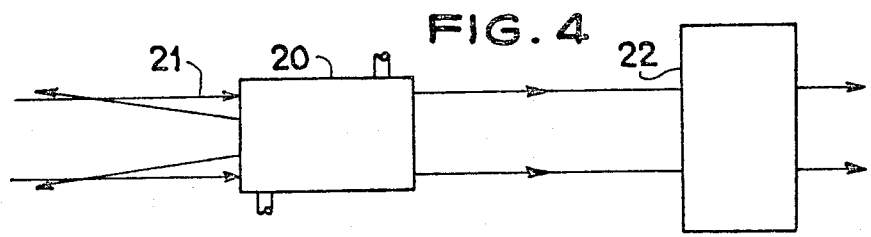
FIG. 4 is a diagrammatic view of an amplifying system equipped with a filtering element such as that shown in FIG. 3.

The amplifying system shown in FIG. 4 is similar to that shown in FIG. 2 except for the fact that the eliminating element 20 placed in the path of the laser beam 21 upstream of an amplifying medium 22 is a retrodiffusion element by a stimulated Brillouin effect of the type described with reference to FIG. 3.

As in the preceeding case, a plurality of eliminating elements may be placed in the path of the laser beam. In this case, the relative position of the elements is chosen in such manner as to diminish the reinjection of the diffused light rearwardly in the neighbouring amplifying medium. The intensity fluctuation eliminating elements just described operate, one in employing the self-focussing principle, and the other in employing retrodiffusion by a stimulated Brillouin effect.

However, these two effects as well as others, such as the stimulated Raman effect and/or the stimulated Rayleigh effect, are produced simultaneously by a small-scale intensity fluctuation so that under certain conditions it is possible to envisage the use of an eliminating element which employs a plurality of these effects in combination which would enable the efficiency of the filtering obtained to be improved.

It is also possible to envisage placing in the same beam a plurality of filtering cells employing either of the aforementioned phenomena. The eliminating elements described hereinbefore are separate elements placed in the path of the laser beam to be treated, but it is also possible to incorporate them in the cavity of the laser employed as a source.

For the optical wavelengths considered in the present description, liquids are employed as filtering media but gases under a suitable pressure may also be employed as the nonlinear filtering medium, in particular in the remote infrared and ultraviolet range where most liquids are opaque.

The intensity fluctuation eliminating elements according to the invention enable in particular the efficiency of lasers to be improved by the use of mean intensities higher than those employed conventionally.

Having now described my invention what I claim as new and desire to secure by Letters Patent is:

1. A method for eliminating small-scale, spatial intensity fluctuations in laser beams, comprising the steps of placing in the path of the laser beam at least one non-linear filtering element constituted by a fluid medium having an index of refraction increasing with the intensity of light passing through the fluid medium; and focussing only the laser small-scale, spatial intensity fluctuations above a power threshold determined by $$P \text{ (threshold)} = \frac{C}{8\pi} \pi R^2 n_0 |E|^2 = \frac{(1.22\gamma)^2 C}{512\, n_2}$$

at a focal point within said fluid medium whereby the energy contained in said small-scale, spatial intensity fluctuations is dissipated and therefore eliminated from said laser beam.

2. The method as claimed in claim 1, wherein said fluid medium has elongated molecules and a short orientation time.

3. The method as claimed in claim 1, wherein the fluid medium has the further property of back reflection of the laser beam small-scale, spatial intensity fluctuations above a stimulated Brillouin power threshold.

4. The method as claimed in claim 1 containing the further step of passing said fluid medium through said non-linear filtering element.

5. The method as claimed in claim 1 wherein said fluid medium is a liquid selected from the group consisting of carbon disulphide, chloronaphthalene and nitrobenzene.

6. A method for eliminating small-scale, spatial intensity fluctuations in laser beams, comprising the steps of placing in the path of the laser beam at least one non-linear filtering element constituted by a fluid medium wherein high frequency sound waves propagate with low attenuation; and back reflecting only the small-scale, spatial intensity fluctuations above a stimulated Brillouin power threshold whereby the energy contained in said small-scale, spatial intensity fluctuations is eliminated from said laser beam.

7. The method as claimed in claim 6 containing the further step of passing said fluid medium through said nonlinear filtering element.

8. The method as claimed in claim 6 wherein said fluid medium is a liquid selected from the group consisting of acetone and benzene.

* * * * *